United States Patent
Du et al.

(10) Patent No.: US 11,581,746 B2
(45) Date of Patent: Feb. 14, 2023

(54) BATTERY LIFE OF BATTERY POWERED WIRELESS DEVICES

(71) Applicant: Schlage Lock Company LLC, Carmel, IN (US)

(72) Inventors: Liqiang Du, Carmel, IN (US); David I. Newby, Plainfield, IN (US); Ilamparithi Ashok Dileephan, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 331 days.

(21) Appl. No.: 16/794,667

(22) Filed: Feb. 19, 2020

(65) Prior Publication Data

US 2021/0257844 A1  Aug. 19, 2021

(51) Int. Cl.
| | |
|---|---|
| *H02J 7/34* | (2006.01) |
| *H02J 7/00* | (2006.01) |
| *H04W 48/20* | (2009.01) |
| *H04W 84/12* | (2009.01) |
| *H02J 50/80* | (2016.01) |
| *H04W 48/16* | (2009.01) |

(52) U.S. Cl.
CPC .......... *H02J 7/00034* (2020.01); *H02J 50/80* (2016.02); *H04W 48/16* (2013.01); *H04W 48/20* (2013.01); *H04W 84/12* (2013.01)

(58) Field of Classification Search
CPC ....... H02J 50/80; H02J 7/00034; H04L 67/12; H04L 12/40; H04L 2012/40267; H04L 5/0051; H04L 5/0053; H04L 63/14; H04L 63/1416; H04L 27/0006; H04L 5/0092; H04L 12/18; H04L 12/4633; H04L 12/4641; H04L 41/12; H04L 5/001; H04L 5/0026; H04L 5/0032; H04L 5/0048; H04L 5/0064; H04L 5/1469; H04L 63/0236; H04L 63/0272; H04L 63/029; H04L 63/1408; H04L 63/1425; H04L 63/145; H04L 69/08; H04L 69/16
USPC ................................................... 320/106–115
See application file for complete search history.

(56) References Cited

U.S. PATENT DOCUMENTS

| | | | |
|---|---|---|---|
| 2014/0269470 A1* | 9/2014 | Hybertson | ................ G06F 1/30 370/311 |
| 2016/0212702 A1* | 7/2016 | Ghosh | ............... H04W 72/1268 |
| 2019/0289543 A1* | 9/2019 | Kandasamy | ...... H04W 52/0235 |

* cited by examiner

*Primary Examiner* — Binh C Tat
(74) *Attorney, Agent, or Firm* — Taft Stettinius & Hollister LLP (57) ABSTRACT

A method of reducing a power consumption of a wireless device according to one embodiment includes performing, by the wireless device, a calibration of wireless communication circuitry of the wireless device in response to establishing a wireless communication connection with a wireless access point, determining, by the wireless device, a number of disconnections between the wireless device and the wireless access point over a predefined period of time, and increasing, by the wireless device, a sleep interval of the wireless communication circuitry of the wireless device in response to determining the number of disconnections between the wireless device and the wireless access point over the predefined period of time is less than a threshold number of disconnections.

17 Claims, 5 Drawing Sheets

BATTERY LIFE OF BATTERY POWERED WIRELESS DEVICES

BACKGROUND

Battery powered wireless devices, such as wireless Internet of Things (IoT) devices, are typically maintained in an "awake" state to receive data transmitted by and respond to queries from a wireless access point intended for the device. A particular wireless device is often designed to stay awake in order to ensure that the wireless device receives data intended for it without latency and to ensure that the wireless access point does not disassociate the wireless device from the network.

The IEEE 802.11 standard outlines specific protocols for implementing Wi-Fi-based wireless local area network (WLAN) communications, which is a prevalent wireless communication technology. However, the standard offers a significant amount of latitude to wireless access point vendors with respect to various aspects of the operation of wireless access points. As such, each vendor uses its discretion in handling those characteristics and parameters of its wireless access point.

SUMMARY

One embodiment is directed to a unique system, components, and methods for reducing the power consumption of devices utilizing wireless technologies. Other embodiments are directed to apparatuses, systems, devices, hardware, methods, and combinations thereof for reducing the power consumption of devices utilizing wireless technologies.

According to an embodiment, a method of reducing a power consumption of a wireless device may include performing, by the wireless device, a calibration of wireless communication circuitry of the wireless device in response to establishing a wireless communication connection with a wireless access point, determining, by the wireless device, a number of disconnections between the wireless device and the wireless access point over a predefined period of time, and increasing, by the wireless device, a sleep interval of the wireless communication circuitry of the wireless device in response to determining the number of disconnections between the wireless device and the wireless access point over the predefined period of time is less than a threshold number of disconnections.

In some embodiments, the method may further include determining, by the wireless device, a second number of disconnections between the wireless device and the wireless access point over the predefined period of time in response to increasing the sleep interval based on the number of disconnections between the wireless device and the wireless access point being less than the threshold number of disconnections, and returning, by the wireless device, the sleep interval of the wireless communication circuitry of the wireless device to a prior sleep interval in response to determining the second number of disconnections between the wireless device and the wireless access point over the predefined period of time is at least the threshold number of disconnections.

In some embodiments, the method may further include determining, by the wireless device, an amount of at least one of broadcast or multicast traffic messages received by the wireless device, and increasing, by the wireless device, the sleep interval of the wireless communication circuitry of the wireless device in response to determining the amount of the at least one of the broadcast or multicast traffic messages received by the wireless device exceeds a threshold amount of traffic.

In some embodiments, the method may further include determining, by the wireless device, a second number of disconnections between the wireless device and the wireless access point over the predefined period of time in response to increasing the sleep interval based on the amount of the at least one of the broadcast or multicast traffic messages received by the wireless device exceeding the threshold amount of traffic, and returning, by the wireless device, the sleep interval of the wireless communication circuitry of the wireless device to a prior sleep interval in response to determining the second number of disconnections between the wireless device and the wireless access point over the predefined period of time is at least the threshold number of disconnections.

In some embodiments, determining the number of disconnections may include periodically determining the number of disconnections between the wireless device and the wireless access point over the predefined period of time.

In some embodiments, the method may further include determining, by the wireless device, a wireless signal strength of the wireless communication connection established between the wireless device and the wireless access point, disconnecting, by the wireless device, the wireless communication connection with the wireless access point in response to determining that the wireless signal strength of the wireless communication connection established between the wireless device and the wireless access point is below a threshold signal strength, and establishing a wireless communication connection with another wireless access point in response to disconnecting the wireless communication connection with the wireless access point.

In some embodiments, the method may further include determining, by the wireless device, a wireless signal strength of a prospective wireless communication connection between the wireless device and the another wireless access point, and disconnecting the wireless communication connection with the wireless access point may include disconnecting the wireless communication connection with the wireless access point in response to determining that the wireless signal strength of the wireless communication connection established between the wireless device and the wireless access point is below the threshold signal strength and the wireless signal strength of the prospective wireless communication connection between the wireless device and the another wireless access point is greater than the wireless signal strength of the wireless communication connection established between the wireless device and the wireless access point.

In some embodiments, the wireless communication circuitry may include Wi-Fi communication circuitry.

In some embodiments, the wireless device may be an access control device including a physical lock mechanism to secure a corresponding passageway, and the wireless access point may be a router.

According to another embodiment, a wireless router may include a Wi-Fi communication circuitry, at least one processor, and at least one memory comprising a plurality of instructions stored thereon that, in response to execution by the at least one processor, causes the wireless device to perform a calibration of the Wi-Fi communication circuitry in response to establishing a Wi-Fi communication connection with a wireless access point, determine a number of Wi-Fi disconnections between the wireless device and the wireless access point over a predefined period of time, and increase a sleep interval of the Wi-Fi communication circuitry in response to determining the number of Wi-Fi disconnections between the wireless device and the wireless access point over the predefined period of time is less than a threshold number of Wi-Fi disconnections.

In some embodiments, the plurality of instructions may further cause the wireless device to determine a second number of Wi-Fi disconnections between the wireless device and the wireless access point over the predefined period of time in response to increasing the sleep interval based on the number of Wi-Fi disconnections between the wireless device and the wireless access point being less than the threshold number of Wi-Fi disconnections, and return the sleep interval of the Wi-Fi communication circuitry of the wireless device to a prior sleep interval in response to determining the second number of Wi-Fi disconnections between the wireless device and the wireless access point over the predefined period of time is at least the threshold number of Wi-Fi disconnections.

In some embodiments, the plurality of instructions may further cause the wireless device to determine an amount of at least one of broadcast or multicast traffic messages received by the wireless device, and increase the sleep interval of the Wi-Fi communication circuitry of the wireless device in response to determining the amount of the at least one of the broadcast or multicast traffic messages received by the wireless device exceeds a threshold amount of traffic.

In some embodiments, the plurality of instructions may further cause the wireless device to determine a second number of Wi-Fi disconnections between the wireless device and the wireless access point over the predefined period of time in response to increasing the sleep interval based on the amount of the at least one of the broadcast or multicast traffic messages received by the wireless device exceeding the threshold amount of traffic, and return the sleep interval of the Wi-Fi communication circuitry of the wireless device to a prior sleep interval in response to determining the second number of Wi-Fi disconnections between the wireless device and the wireless access point over the predefined period of time is at least the threshold number of Wi-Fi disconnections.

In some embodiments, to determine the number of Wi-Fi disconnections may include to periodically determine the number of Wi-Fi disconnections between the wireless device and the wireless access point over the predefined period of time.

In some embodiments, the plurality of instructions may further cause the wireless device to determine a wireless signal strength of the Wi-Fi communication connection established between the wireless device and the wireless access point, disconnect the Wi-Fi communication connection with the wireless access point in response to determining that the wireless signal strength of the Wi-Fi communication connection established between the wireless device and the wireless access point is below a threshold signal strength, and establish a Wi-Fi communication connection with another wireless access point in response to disconnecting the Wi-Fi communication connection with the wireless access point.

In some embodiments, the wireless device may further include a physical lock mechanism having at least one of a latch or a bolt to secure a corresponding passageway.

According to yet another embodiment, an access control device may include a Wi-Fi communication circuitry, a lock mechanism having at least one of a latch or a bolt to secure a corresponding passageway, at least one processor, and at least one memory comprising a plurality of instructions stored thereon that, in response to execution by the at least one processor, causes the access control device to perform a calibration of the Wi-Fi communication circuitry in response to establishing a Wi-Fi communication connection with a wireless access point, determine a number of Wi-Fi disconnections between the access control device and the wireless access point over a predefined period of time, and increase a sleep interval of the Wi-Fi communication circuitry in response to determining the number of Wi-Fi disconnections between the access control device and the wireless access point over the predefined period of time is less than a threshold number of Wi-Fi disconnections.

In some embodiments, the plurality of instructions may further cause the access control device to determine a second number of Wi-Fi disconnections between the access control device and the wireless access point over the predefined period of time in response to increasing the sleep interval based on the number of Wi-Fi disconnections between the access control device and the wireless access point being less than the threshold number of Wi-Fi disconnections, and return the sleep interval of the Wi-Fi communication circuitry of the access control device to a prior sleep interval in response to determining the second number of Wi-Fi disconnections between the access control device and the wireless access point over the predefined period of time is at least the threshold number of Wi-Fi disconnections.

In some embodiments, the plurality of instructions may further cause the access control device to determine an amount of at least one of broadcast or multicast traffic messages received by the access control device, and increase the sleep interval of the Wi-Fi communication circuitry in response to determining the amount of the at least one of the broadcast or multicast traffic messages received by the access control device exceeds a threshold amount of traffic.

In some embodiments, the plurality of instructions may further cause the access control device to determine a wireless signal strength of the Wi-Fi communication connection established between the access control device and the wireless access point, disconnect the Wi-Fi communication connection with the wireless access point in response to determining that the wireless signal strength of the Wi-Fi communication connection established between the access control device and the wireless access point is below a threshold signal strength, and establish a Wi-Fi communication connection with another wireless access point in response to disconnecting the Wi-Fi communication connection with the wireless access point.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
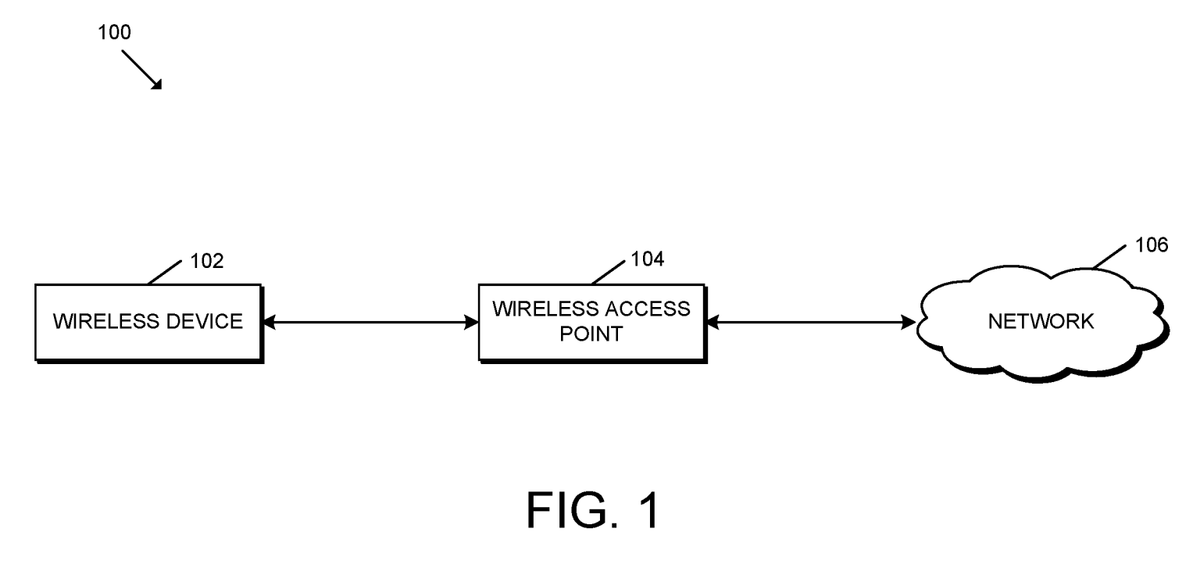
FIG. 1 is a simplified block diagram of a system for increasing a sleep interval of a wireless device utilizing wireless technologies to reduce the power consumption of the wireless device.

Referring now to FIG. 1, in the illustrative embodiment, a system 100 includes a wireless device 102, a wireless access point 104, and a network 106. Although only one wireless device 102 and one wireless access point 104 are shown in the illustrative embodiment of FIG. 1, the system 100 may include multiple wireless devices 102 and/or wireless access points 104 in other embodiments. For example, in some embodiments, multiple wireless devices 102 may be configured to communicate with the same wireless access point 104.

The wireless device 102 may be embodied as any type of device or collection of devices suitable for wireless communicating with the wireless access point 104 (e.g., via Wi-Fi communication circuitry) and otherwise performing the functions described herein. For example, in some embodiments, the wireless device 102 may be embodied as an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), a peripheral controller of a passageway, credential reader device, and/or other type of access control device. As such, in some embodiments, the wireless device 102 may include, or be electrically coupled to, a physical lock mechanism configured to control access through a passageway and/or other components typical of a lock device. For example, the lock mechanism may include a deadbolt, a latch bolt, a lever, and/or other mechanism adapted to move between a locked state and an unlocked state. In some embodiments, the wireless device 102 may be stationary or have fixed movements (e.g., as with a fixed path of a door-mounted device). Although the wireless device 102 may be described herein in reference to access control, it should be appreciated that the wireless device 102 may be unrelated to access control in other embodiments.

The wireless access point 104 may be embodied as any one or more devices that, individually or collectively, allow wireless communication devices (e.g., the wireless device 102) to connect to a wired network and/or the Internet (e.g., via the network 106). For example, in some embodiments, the wireless access point 104 may be embodied as a gateway device that is communicatively coupled to a router. In other embodiments, the wireless access point 104 may form an integral component of or otherwise form a portion of the router itself. For simplicity and clarity of the description, the wireless access point 104 is described herein as being communicatively coupled to the Internet. Further, in some embodiments, it should be appreciated that the wireless access point 104 is configured to wirelessly communicate with devices (e.g., the wireless device 102) via Wi-Fi communication circuitry. In some embodiments, it should be appreciated that the wireless access point 104 may be embodied as or include a mesh node and/or network extender (e.g., a Wi-Fi extender).

The network 106 may be embodied as any type of communication network capable of facilitating communication between the various devices of the system 100. As such, the network 106 may include one or more networks, routers, switches, computers, and/or other intervening devices. For example, the network 106 may be embodied as or otherwise include one or more cellular networks, telephone networks, local or wide area networks, publicly available global networks (e.g., the Internet), ad hoc networks, or a combination thereof.

It should be appreciated that the wireless device 102 and/or the wireless access point 104 may be embodied as one or more computing devices similar to the computing device 200 described below in reference to FIG. 2. For example, each of the wireless device 102 and the wireless access point 104 may include a processing device 202 and a memory 206 having stored thereon operating logic 208 (e.g., a plurality of instructions) for execution by the processing device 202 for operation of the corresponding device.

As indicated above, battery powered wireless devices (e.g., the wireless device 102) are often maintained in an "awake" state to receive data transmitted by and respond to queries from a wireless access point (e.g., the wireless access point 104) intended for the device. Wireless devices 102 (e.g., wireless IoT devices) are ubiquitous in homes, offices, and other locations, which means there are often many wireless devices 102 consistently "chattering" in the network (e.g., transmitting broadcast and/or multicast packets). Broadcast/multicast traffic may be messages/packets that are sent out to every node on the network (or a portion thereof) and commonly used, for example, to announce that network resources are now available, to advertise services, and/or to make requests for address resolution. As such, wireless devices 102 often receive and parse data packets from many other devices even when there is no information in those packets relevant to the particular wireless device 102 doing the parsing. It should be appreciated that battery powered devices (e.g., wireless devices 102) have power capacity constraints (e.g., relative to line powered devices), and consistently maintaining the devices 102 in an awake state causes the battery to drain quickly, which results in a reduced battery life of the device 102.

As such, the wireless device 102 may be placed in a low power sleep state in order to conserve power (e.g., when not communicating with the wireless access point 104), which allows the wireless device 102 to ignore broadcast and multicast traffic intended for different devices. However, if the wireless device 102 remains in a sleep state for too long (and misses too many packets from the wireless access point 104), the access point 104 may drop/disconnect its connection with the wireless device 102 and/or otherwise disassociate the wireless device 102 from the network. As such, the wireless device 102 may balance the amount of time the device 102 is in a low-powered sleep state (e.g., to conserve power) with the operational considerations of being awake to be responsive to user operations (e.g., avoiding latency in the user experience when a user attempts to gain access) and avoid network disassociation.

It should be further appreciated that the operating environment of a particular wireless device 102 is likely to change over time, which may impact the battery life of the wireless device 102. For example, new wireless devices 102 may be introduced into the system 100, which may cause wireless interference or additional traffic in the network (e.g., due to chattiness). The location of the wireless access point 10 may be changed, which may cause a variation in the signal strength of the wireless communication connection with the wireless device 102 (e.g., a previously strong signal may now be poor in view of the change in location of the wireless access point 104). Similarly, one or more mesh nodes in the system 100 with a good signal strength may become unavailable, which may cause the wireless device 102 to connect to the next available mesh node, which may have a less favorable signal strength. In some circumstances, the wireless access point 104 may go offline, which may cause the wireless device 102 to connect (e.g., automatically) to a different wireless access point 104 having the same network SSID name (e.g., in locations with multiple wireless access points 104). Further, there may be circumstances in which someone introduces one or more new objects (e.g., a metal cabinet, objects/devices causing interference, etc.) in the physical environment of the wireless device 102, which may change the optimal calibration of the wireless communication circuitry (e.g., Wi-Fi communication circuitry) of the wireless device 102.

The techniques described herein may allow the wireless device 102 "learn" about its installed environment and self-determine how to modify its operating and/or communication behavior to reduce power consumption (i.e., improving battery life). For example, as described in greater detail below, upon connecting to the wireless access point 104, the wireless device 102 may obtain configuration data, wireless radio data, and/or other relevant data (e.g., the beacon interval, delivery traffic indication map (DTIM) interval, etc.). Based on those settings, the wireless device 102 may determine the initial minimum number of beacons that may be skipped or ignored without suffering a performance impact, which the wireless device 102 may use to determine a duration (e.g., minimum duration) for which the wireless device 102 is to enter a low power sleep state (e.g., power save mode) without having to receive beacons from the wireless access point 104. In other words, the wireless device 102 may determine a "power save mode duration," "sleep duration," or "sleep interval" for the wireless communication circuitry. The wireless device 102 may continue to periodically monitor its performance, for example, for unanticipated disconnections from the wireless access point 104, unacceptable delay (e.g., based on predefined criteria) in receiving data that would result in unsatisfactory performance, and/or other performance criteria. If there is no (or negligible) performance impact, the wireless device 102 may periodically increase the sleep interval (e.g., up to a predefined maximum interval) and continue to monitor for performance degradation. If the wireless device 102 detects performance degradation (e.g., a certain number of disconnections from the wireless access point 104 within a predefined time period), the wireless device 102 may revert to the previously known acceptable sleep interval and stop adjusting the interval (e.g., until a periodic wireless recalibration).

Further, in some embodiments, the wireless device 102 may monitor/track the network "chattiness" in terms of, for example, the number of broadcast packets and/or the number of multicast packets received by the wireless device 102. If the wireless device 102 determines that it is receiving too much broadcast/multicast traffic (e.g., by receiving at least a threshold number of broadcast/multicast packets/messages), the wireless device 102 may increase the sleep interval. The wireless device 102 may then continue to monitor its performance, for example, for unanticipated disconnections from the wireless access point 104, unacceptable delay (e.g., based on predefined criteria) in receiving data that would result in unsatisfactory performance, and/or other performance criteria. In some embodiments, if there is no (or negligible) performance impact, the wireless device 102 may periodically increase the sleep interval (e.g., up to a predefined maximum interval) and continue to monitor for performance degradation. If the wireless device 102 detects performance degradation (e.g., a certain number of disconnections from the wireless access point 104 within a predefined time period), the wireless device 102 may revert to the previously known acceptable sleep interval and stop adjusting the interval (e.g., until a periodic wireless recalibration). In some embodiments, the wireless device 102 may further re-evaluate whether it is continuing to receive too much broadcast/multicast traffic and only further increase the sleep interval if that traffic continues to be too much (e.g., exceeds the threshold), whereas in other embodiments, the wireless device 102 may continue to attempt to proactively increase the sleep interval to the extent that it does not degrade performance.

As indicated above, in some embodiments, the wireless access point 104 may go offline and/or the network environment may change for various reasons, which may affect the wireless signal strength between the wireless device 102 and the wireless access point 104 (or new wireless access point 104 to which the wireless device 102 has automatically connected). Accordingly, the wireless device 102 may periodically re-evaluate (e.g., via wireless re-calibration) whether the wireless signal strength is sufficiently strong (e.g., above a predefined threshold). If the signal strength is poor, the wireless device 102 may attempt to connect to another wireless access point 104 with a better signal strength.

Figure 2:
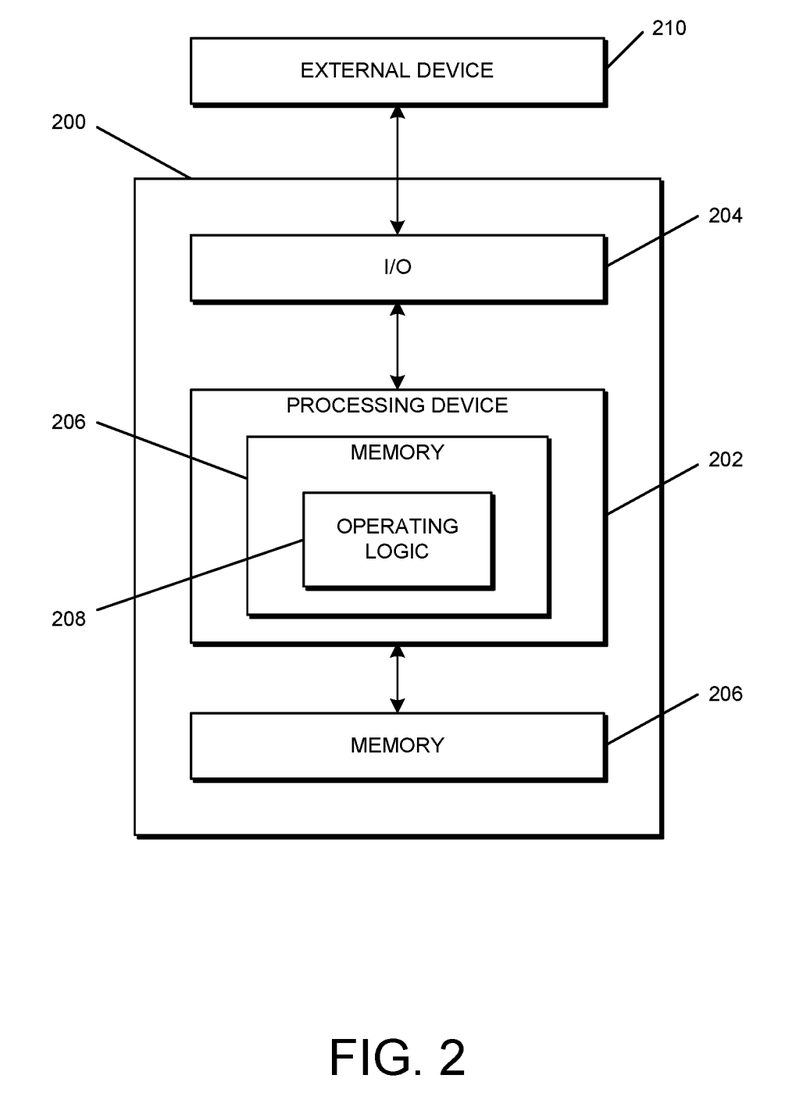
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a wireless device 102 and/or wireless access point 104 illustrated in FIG. 1. Depending on the particular embodiment, computing device 200 may be embodied as a wireless device, access control device, reader device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, wireless access point, mesh node, wireless extender, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth (including Bluetooth Low Energy (BLE), Wi-Fi, Near Field Communication (NFC), WiMAX, ZigBee, Z-wave, IEEE 802.15, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the wireless device 102 and/or the wireless access point 104. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
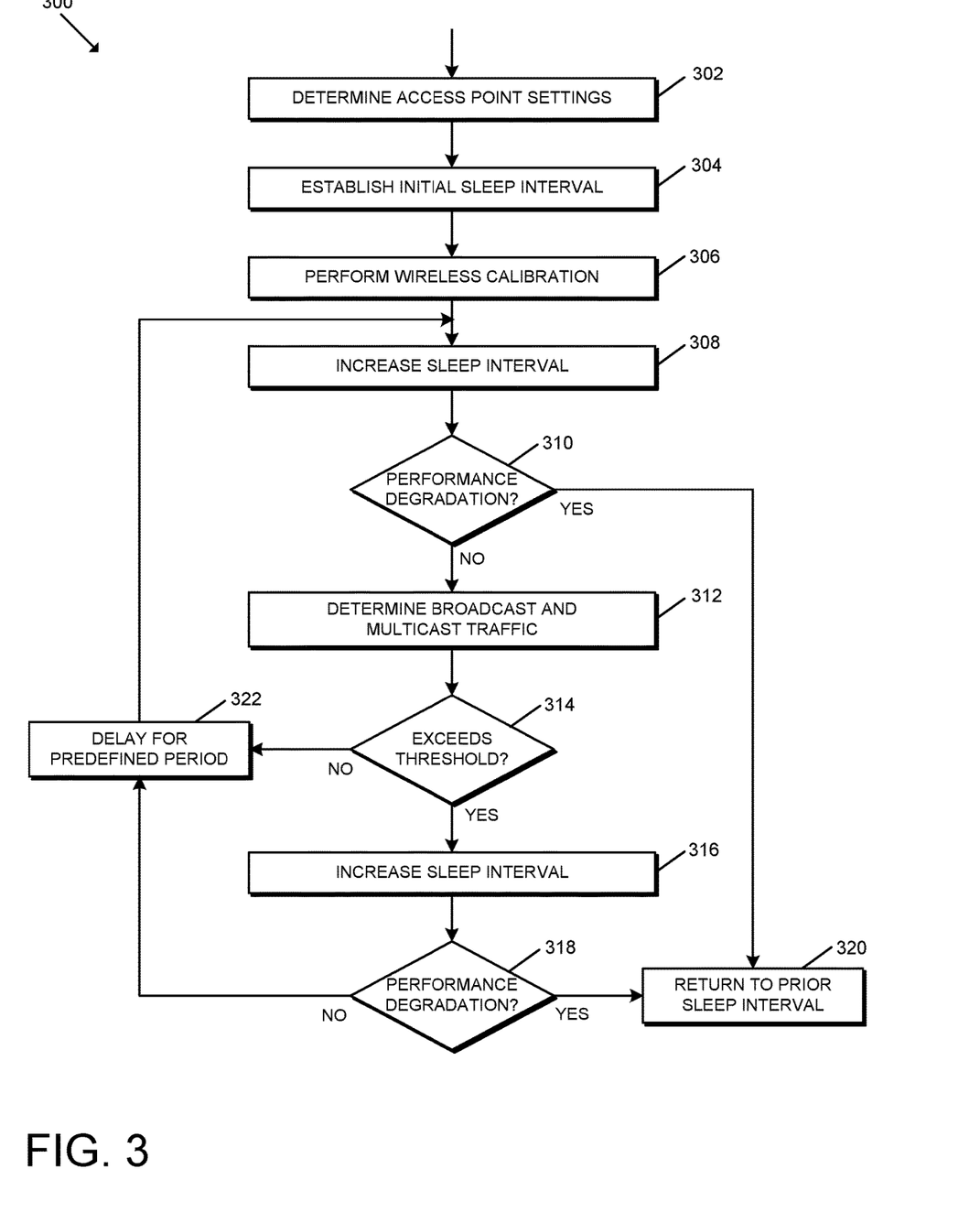
FIG. 3 is a simplified flow diagram of at least one embodiment of a method for increasing a sleep interval of wireless communication circuitry of the wireless device of the system of FIG. 1 at startup of the wireless device to reduce the power consumption of the wireless device.

Referring now to FIG. 3, in use, the system 100 or, more specifically, the wireless device 102 may execute a method 300 for increasing a sleep interval of wireless communication circuitry (e.g., Wi-Fi communication circuitry) of the wireless device 102 at startup of the wireless device 102 to reduce the power consumption of the wireless device 102. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the wireless device 102 determines the settings of the wireless access point 104 and/or other settings associated with a wireless connection (e.g., Wi-Fi connection) between the wireless device 102 and the wireless access point 104. For example, in some embodiments, the wireless device 102 may determine a delivery traffic indication map (DTIM) interval and/or beacon interval of the wireless access point 104. It should be appreciated that the delivery traffic indication map of the wireless access point 104 is a number/value that determines how frequently a beacon frame is transmitted (e.g., via Wi-Fi) from the wireless access point 104 to networked devices (e.g., the wireless device 102) including a delivery traffic indication message (collectively referred to herein as DTIM or DTIM interval for simplicity). As described above, the IEEE 802.11 standard offers a significant amount of latitude to wireless access point vendors with respect to various aspects of the operation of wireless access points 104. For example, the current standard does not mandate a particular DTIM setting of the wireless access point 104; instead, the standard allows vendors discretion with that particular wireless access point characteristic. The number of beacons that can be ignored by a wireless device 102 without loss of a connection between the wireless device 102 and the wireless access point 104 is likewise not predefined by the current standard and, as a result, the connection-dropping behavior of wireless access points 104 is also not uniformly defined across all wireless access points 104. It should be appreciated that the wireless device 102 may determine the DTIM interval and/or beacon interval of the wireless access point 104 using any suitable technique and/or mechanism (e.g., based on wireless communications between those devices 102, 104). Further, in determining the settings of the wireless access point 104, the wireless device 102 may receive various data from the wireless access point 104 (e.g., radio diagnostic information) and/or determine various other characteristics of the wireless network environment.

In block 304, the wireless device 102 establishes an initial sleep interval (e.g., a sleep interval (SI) or long sleep interval (LSI)) for the wireless communication circuitry (e.g., Wi-Fi communication circuitry) of the wireless device 102, which may dictate the sleep interval for which the wireless device 102 or, more specifically, the wireless communication circuitry may be placed in the low power sleep state before waking up to check for beacons/packets/messages transmitted from the wireless access point 104. In some embodiments, it should be appreciated that the wireless device 102 may establish the initial sleep interval based on the determined settings/parameters of the wireless access point 104. For example, in some embodiments, the initial sleep interval may be between 600 ms and 1600 ms.

In block 306, the wireless device 102 performs a wireless calibration for the wireless communication circuitry (e.g., the Wi-Fi communication circuitry) of the wireless device 102. For example, the wireless device 102 may perform a hardware radio calibration to learn the wireless (e.g., Wi-Fi) environment in order to adjust its operational parameters for optimal, best possible, and/or acceptable operation in that particular environment.

In block 308, the wireless device 102 increases the sleep interval of the wireless communication circuitry (e.g., the Wi-Fi communication circuitry). In some embodiments, the sleep interval may be increased by a predefined about of time (e.g., in milliseconds). As described above, it should be appreciated that the sleep interval may be increased in order to reduce the power consumption of the wireless device 102 and thereby improve the battery life thereof. In block 310, the wireless device 102 determines whether the wireless device 102 has experienced performance degradation due to the increase in the sleep interval. For example, in some embodiments, the wireless device 102 may determine the number of disconnections between the wireless device 102 and the wireless access point 104 over a predefined period of time (e.g., one hour, one half hour, two hours, etc.), and the wireless device 102 may further determine whether that number of disconnections has exceeded (or is at least) a threshold number of disconnections (e.g., two disconnections, three disconnections, four disconnections, etc.). If the number of disconnections has exceeded (or is at least) the threshold number of disconnections, the wireless device 102 may be determined to have suffered from degraded performance. In other embodiments, it should be appreciated that the wireless device 102 may otherwise determine whether performance degradation has occurred.

If the wireless device 102 determines, in block 310, that performance degradation has occurred, the method 300 advances to block 320 in which the wireless device 102 returns the sleep interval of the wireless communication circuitry (e.g., Wi-Fi communication circuitry) of the wireless device 102 to a prior sleep interval of the wireless device 102 (e.g., a sleep interval that did not result in degraded performance). However, if the wireless device 102 determines, in block 310, that no performance degradation has occurred, the method 300 advances to block 312 in which the wireless device 102 determines an amount of broadcast and/or multicast traffic (e.g., in terms of the number/volume of packets, messages, and/or otherwise) received by the wireless device 102 over a predefined period of time. It should be appreciated that the predefined period may be the same or different from the predefined period associated with determining the number of disconnections from the wireless access point 104 (see, e.g., block 310).

In block 314, the wireless device 102 determines whether the amount of broadcast and/or multicast traffic received by the wireless device 102 has exceeded (or is at least) a threshold amount of traffic over the predetermined period of time. If the wireless device 102 determines, in block 314, that the amount of broadcast and/or multicast traffic received by the wireless device 102 has not exceeded (or is not at least) the threshold amount of traffic, the method 300 advances to block 322 in which the method 300 delays for a predefined period of time (e.g., one hour, one half hour, two hours, etc.) before returning to block 308 in which the sleep interval is again increased. However, if the wireless device 102 determines, in block 314, that the amount of broadcast and/or multicast traffic received by the wireless device 102 has exceeded (or is at least) the threshold amount of traffic, the method 300 advances to block 316 in which the wireless device 102 further increases the sleep interval of the wireless communication circuitry (e.g., Wi-Fi communication circuitry) of the wireless device 102.

In block 318, the wireless device 102 again determines whether the wireless device 102 has experienced performance degradation due to the further increase in the sleep interval. For example, as described above, the wireless device 102 may determine the number of disconnections between the wireless device 102 and the wireless access point 104 over a predefined period of time and whether that number of disconnections has exceeded (or is at least) a threshold number of disconnections. If the wireless device 102 determines, in block 318, that performance degradation has occurred, the method 300 advances to block 320 in which the wireless device 102 returns the sleep interval of the wireless communication circuitry (e.g., Wi-Fi communication circuitry) of the wireless device 102 to a prior sleep interval of the wireless device 102 (e.g., a sleep interval that did not result in degraded performance). However, if the wireless device 102 determines, in block 318, that no performance degradation has occurred, the method 300 advances to block 322 in which the method 300 delays for a predefined period of time before returning to block 308 in which the sleep interval is again increased.

In other words, as described herein, the wireless device 102 may periodically increase the sleep interval of the wireless communication circuitry (e.g., Wi-Fi communication circuitry) of the wireless device 102 and to reduce the power consumption and/or the amount of broadcast/multicast traffic received by the wireless device 102 while ensuring that the performance and/or user experience does not suffer (e.g., measured in terms of the number of disconnections from the wireless access point 104 over a predefined period of time).

Although the blocks 302-322 are described in a relatively serial manner, it should be appreciated that various blocks of the method 300 may be performed in parallel in some embodiments.

Figure 4:
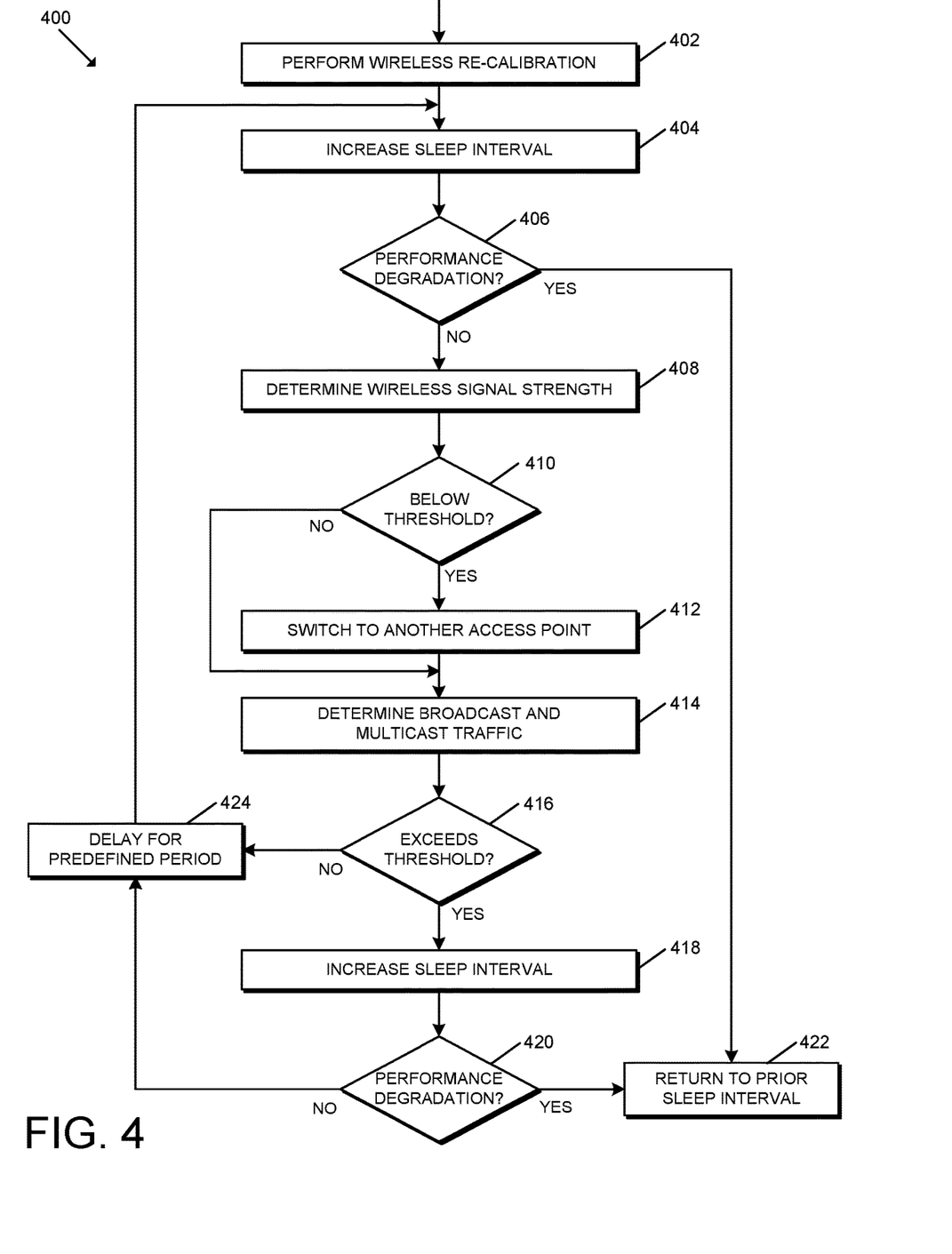
FIG. 4 is a simplified flow diagram of at least one embodiment of a method for increasing the sleep interval of wireless communication circuitry of the wireless device of the system of FIG. 1 at re-calibration of the wireless device.

Referring now to FIG. 4, in use, the system 100 or, more specifically, the wireless device 102 may execute a method 400 for increasing a sleep interval of wireless communication circuitry (e.g., Wi-Fi communication circuitry) of the wireless device 102 at re-calibration of the wireless device 102. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the wireless device 102 performs a wireless re-calibration for the wireless communication circuitry (e.g., the Wi-Fi communication circuitry) of the wireless device 102. For example, as described above, the wireless device 102 may perform a hardware radio calibration to learn the wireless (e.g., Wi-Fi) environment in order to adjust its operational parameters for optimal, best possible, and/or acceptable operation in that particular environment.

In block 404, the wireless device 102 increases the sleep interval of the wireless communication circuitry (e.g., the Wi-Fi communication circuitry). As indicated above, in some embodiments, the sleep interval may be increased by a predefined about of time (e.g., in milliseconds). In block 406, the wireless device 102 determines whether the wireless device 102 has experienced performance degradation due to the increase in the sleep interval. For example, as described above, the wireless device 102 may determine the number of disconnections between the wireless device 102 and the wireless access point 104 over a predefined period of time (e.g., one hour, one half hour, two hours, etc.), and the wireless device 102 may further determine whether that number of disconnections has exceeded (or is at least) a threshold number of disconnections. If the number of disconnections has exceeded (or is at least) the threshold number of disconnections, the wireless device 102 may be determined to have suffered from degraded performance. In other embodiments, it should be appreciated that the wireless device 102 may otherwise determine whether performance degradation has occurred.

If the wireless device 102 determines, in block 406, that performance degradation has occurred, the method 400 advances to block 422 in which the wireless device 102 returns the sleep interval of the wireless communication circuitry (e.g., Wi-Fi communication circuitry) of the wireless device 102 to a prior sleep interval of the wireless device 102 (e.g., a sleep interval that did not result in degraded performance). However, if the wireless device 102 determines, in block 406, that no performance degradation has occurred, the method 400 advances to block 408 in which the wireless device 102 determines a wireless signal strength of the wireless communication connection established between the wireless device 102 and the wireless access point 104. As described above, the wireless signal strength may degrade or change over time due to various factors (e.g., new objects introduced into the physical environment, the wireless access point 104 dropping offline, etc.). In some embodiments, the wireless device 102 may determine the signal strength based on a received signal strength indicator (RSSI) of wireless communications and/ or other indicator of signal strength. However, it should be appreciated that the wireless device 102 may use any other suitable technique and/or mechanism to determine the wireless signal strength in other embodiments.

In block 410, the wireless device 102 determines whether the wireless signal strength of the wireless communication connection with the wireless access point 104 is below (or no more than) a threshold signal strength. If the wireless device 102 determines, in block 410, that the wireless signal strength is below (or no more than) the threshold signal strength, the method 400 advances to block 412 in which the wireless device 102 may attempt to switch to another wireless access point 104 in the system 100. In particular, the wireless device 102 may identify wireless access points 104 within wireless communication range (e.g., Wi-Fi range) of the wireless device 102 to which the wireless device 102 could potentially connect and determine the respective wireless signal strength of those connections (or potential connections). In some embodiments, if one or more of the prospective wireless access points 104 has a stronger signal strength than the wireless access point 104 to which the wireless device 102 is currently connected, the wireless device 102 may switch to one of those wireless access points 104 (e.g., the wireless access point 104 having the strongest signal strength). More specifically, the wireless device 102 may disconnect/drop the wireless connection with the current wireless access point 104 and establish a new wireless communication connection (e.g., Wi-Fi connection) with one of the prospective wireless access points 104 with the improved signal strength (e.g., the wireless access point 104 having the strongest signal strength).

If the wireless device 102 determines, in block 410, that the wireless signal strength with the currently wireless access point 104 is sufficient by determining that it is not below (or greater than) the threshold signal strength, or in response to switching to another wireless access point 104 in block 412, the method 400 advances to block 414 in which the wireless device 102 determines an amount of broadcast and/or multicast traffic (e.g., in terms of the number/volume of packets, messages, and/or otherwise) received by the wireless device 102 over a predefined period of time.

In block 416, the wireless device 102 determines whether the amount of broadcast and/or multicast traffic received by the wireless device 102 has exceeded (or is at least) a threshold amount of traffic over the predetermined period of time. If the wireless device 102 determines, in block 416, that the amount of broadcast and/or multicast traffic received by the wireless device 102 has not exceeded (or is not at least) the threshold amount of traffic, the method 400 advances to block 424 in which the method 400 delays for a predefined period of time (e.g., one hour, one half hour, two hours, etc.) before returning to block 404 in which the sleep interval is again increased. However, if the wireless device 102 determines, in block 416, that the amount of broadcast and/or multicast traffic received by the wireless device 102 has exceeded (or is at least) the threshold amount of traffic, the method 400 advances to block 418 in which the wireless device 102 further increases the sleep interval of the wireless communication circuitry (e.g., Wi-Fi communication circuitry) of the wireless device 102.

In block 420, the wireless device 102 again determines whether the wireless device 102 has experienced performance degradation due to the further increase in the sleep interval. For example, as described above, the wireless device 102 may determine the number of disconnections between the wireless device 102 and the wireless access point 104 over a predefined period of time and whether that number of disconnections has exceeded (or is at least) a threshold number of disconnections. If the wireless device 102 determines, in block 420, that performance degradation has occurred, the method 400 advances to block 422 in which the wireless device 102 returns the sleep interval of the wireless communication circuitry (e.g., Wi-Fi communication circuitry) of the wireless device 102 to a prior sleep interval of the wireless device 102 (e.g., a sleep interval that did not result in degraded performance). However, if the wireless device 102 determines, in block 420, that no performance degradation has occurred, the method 400 advances to block 424 in which the method 400 delays for a predefined period of time before returning to block 404 in which the sleep interval is again increased.

In other words, as described herein, the wireless device 102 may periodically increase the sleep interval of the wireless communication circuitry (e.g., Wi-Fi communication circuitry) of the wireless device 102 and to reduce the power consumption and/or the amount of broadcast/multicast traffic received by the wireless device 102. In some embodiments, it should be appreciated that the method 400 may be executed by the wireless device 102 periodically (e.g., once per day, once per week, etc.) to make periodic adjustments to the wireless device 102 in order to reduce power consumption without suffering unacceptable performance degradation.

Although the blocks 402-424 are described in a relatively serial manner, it should be appreciated that various blocks of the method 400 may be performed in parallel in some embodiments.

Figure 5:
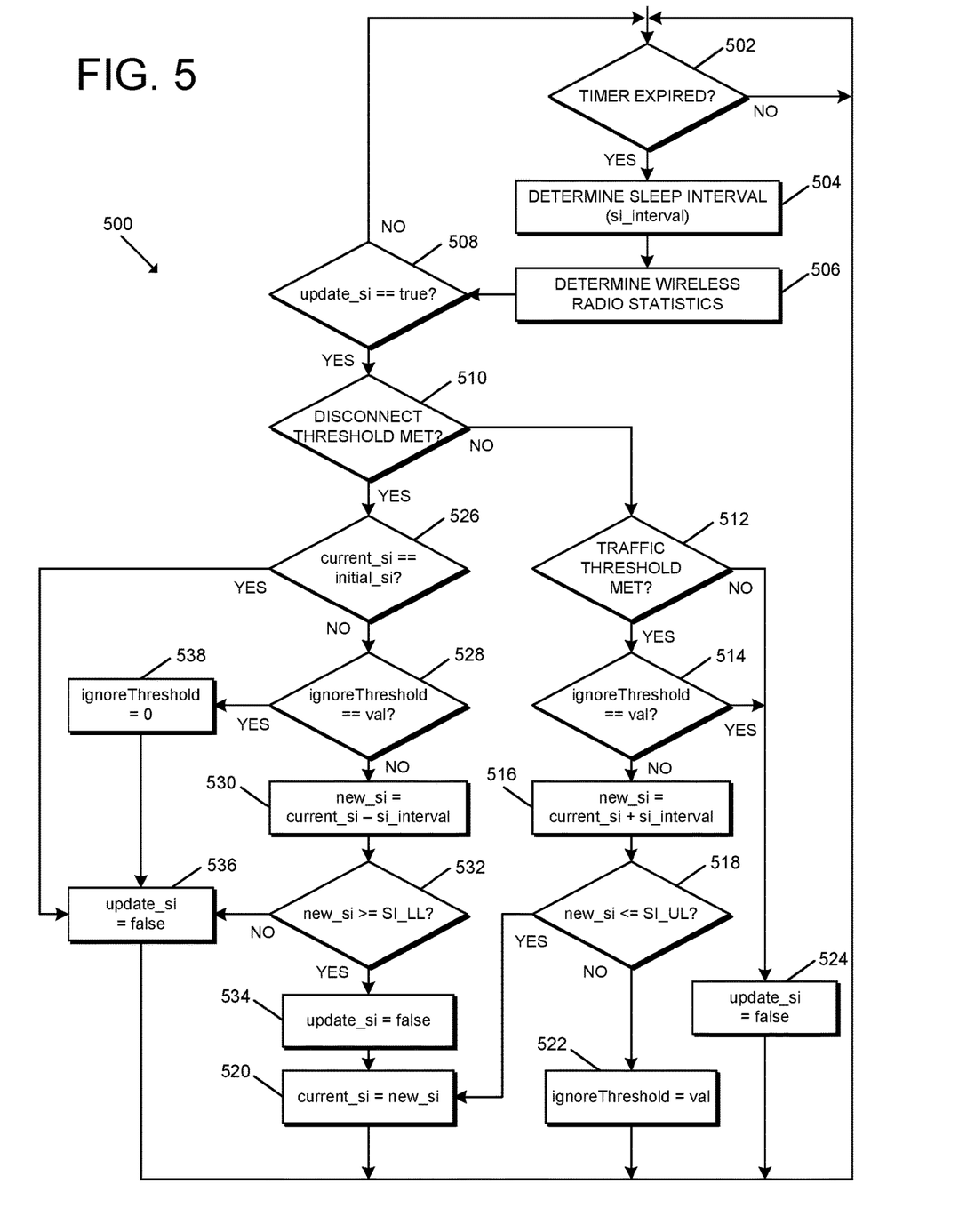
FIG. 5 is a simplified flow diagram of at least one embodiment of a method for increasing a sleep interval of wireless communication circuitry of the wireless device of the system of FIG. 1 to reduce the power consumption of the wireless device.

Referring now to FIG. 5, in use, the system 100 or, more specifically, the wireless device 102 may execute a method 500 for increasing a sleep interval of wireless communication circuitry (e.g., Wi-Fi communication circuitry) of the wireless device 102 to reduce the power consumption of the wireless device 102. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the wireless device 102 determines whether a timer/clock has expired. For example, in some embodiments, the wireless device 102 may use a timer/clock to trigger further execution of the method 500. It should be appreciated that the time delay may vary depending on the particular embodiment (e.g., one hour, one half hour, two hours, etc.). If the wireless device 102 determines, in block 502, that the timer has expired, the method 500 advances to block 504 in which the wireless device 102 determines a sleep interval (si_interval) for the wireless communication circuitry (e.g., Wi-Fi communication circuitry) of the wireless device 102. For example, the wireless device 102 may determine a sleep interval based on one or more of the characteristics described herein. In some embodiments, the wireless device 102 may calculate the sleep interval based on the DTIM interval and/or the beacon interval of the wireless access point 104. For example, the sleep interval may be calculated as the mathematical product of the two intervals (e.g., si_interval=DTIM*beacon_interval). In other embodiments, it should be appreciated that the sleep interval may be otherwise determined.

In block 504, the wireless device 102 may determine one or more wireless radio statistics, which may reflect the wireless communication (e.g., Wi-Fi) environment of the wireless device 102. For example, in some embodiments, the wireless radio statistics may include radio diagnostic information received from the wireless access point 104 and/or based on data received from the wireless access point 104.

In block 508, the wireless device 102 determines whether update the sleep interval of the wireless communication circuitry (e.g., Wi-Fi communication circuitry) of the wireless device 102. In particular, in the illustrative embodiment, the wireless device 102 determines whether a particular value/flag is set to prompt updating of the sleep interval (e.g., whether update_si==true evaluates as true/accurate). If not, the method 500 returns to block 502 in which the wireless device 102 awaits for the timer/clock to expire again (e.g., after a predefined delay period). However, if so, the method 500 advances to block 510 in which the wireless device 102 determines the number of disconnections between the wireless device 102 and the wireless access point 104 over a predefined period of time (e.g., one hour, etc.), and whether that number of disconnections has met a disconnect threshold (e.g., three disconnections within the predefined period of time, etc.).

If, in block 510, the wireless device 102 determines that the disconnect threshold has not been met, the method 500 advances to block 512 in which the wireless device 102 determines an amount of broadcast/multicast traffic (e.g., in terms of the number/volume of packets, messages, and/or otherwise) received by the wireless device 102 over the predefined period of time, and whether the amount of broadcast/multicast traffic has met a traffic threshold. If the wireless device 102 determines, in block 512, that the traffic threshold has not been met, the method 500 advances to block 524 in which the wireless device 102 updates the value/flag associated with updating the sleep interval to discontinue updating the interval (e.g., by assigning update_si=false). However, if the wireless device 102 determines, in block 512, that the traffic threshold has been met, the method 500 advances to block 514 in which the wireless device 102 determines whether a broadcasting skip/ignore traffic parameter/threshold (ignoreThreshold) is set to a particular non-zero value (e.g., ignoreThreshold==5?). It should be appreciated that the broadcasting skip/ignore traffic parameter/threshold may be a particular parameter of a communication circuitry (e.g., a Wi-Fi chip) that allows for avoiding some broadcast traffic, and the particular value may vary depending on the particular embodiment.

If the wireless device 102 determines, in block 514, that the broadcasting skip/ignore traffic parameter/threshold is set to the particular non-zero value, the method 500 advances to block 524 in which the wireless device 102 updates the value/flag associated with updating the sleep interval to discontinue updating the interval (e.g., by assigning update_si=false). However, if the wireless device 102 determines, in block 514, that the broadcasting skip/ignore traffic parameter/threshold is not set to the particular non-zero value, the method 500 advances to block 516 in which the wireless device 102 temporarily increases the sleep interval (e.g., new_si=current_si+si_interval). In block 518, the wireless device 102 determines whether the temporarily increased sleep interval (new_si) is less than or equal to a maximum value or upper limit of the sleep interval (e.g., whether new_si<=SI_UL). For example, in some embodiments, the maximum value of the sleep interval may be 1600 ms. If the wireless device 102 determines, in block 518, that the temporarily increased sleep interval is less than or equal to the maximum value, the method 500 advances to block 520 in which the wireless device 102 sets the current sleep interval to the temporary sleep interval (e.g., current_si=new_si), and the method 500 returns to block 502 to await expiration of the timer/clock. However, if the wireless device 102 determines, in block 518, that the temporarily increased sleep interval is not less than or equal to the maximum value, the method 500 advances to block 522 in which the current sleep interval is maintained and the broadcasting skip/ignore traffic parameter/threshold is set to the particular non-zero value (e.g., 5), and the method returns to block 502 to await expiration of the timer/clock.

Returning to block 510, if the wireless device 102 determines that the disconnect threshold has been met, the method 500 advances to block 526 in which the wireless device 102 determines whether the current sleep interval is equal to the initial sleep interval (i.e., whether current_si==initial_si). If so, the method 500 advances to block 536 in which the wireless device 102 updates the value/flag associated with updating the sleep interval to discontinue updating the interval (e.g., by assigning update_si=false) and maintain the initial sleep interval of the wireless device 102. If the wireless device 102 determines, in block 526, that the current sleep interval is not equal to the initial sleep interval, the method 500 advances to block 528 in which the wireless device 102 determines whether the broadcasting skip/ignore traffic parameter/threshold is set to the particular non-zero value. If so, the wireless device 102 sets the value of the broadcasting skip/ignore traffic parameter/threshold to zero in block 538 and updates the value/flag associated with updating the sleep interval to discontinue updating the interval (e.g., by assigning update_si=false) in block 536, and the method 500 returns to block 502 to await expiration of the timer/clock.

If the wireless device 102 determines, in block 528, that the broadcasting skip/ignore traffic parameter/threshold is not set to the particular non-zero value, the method 500 advances to block 530 in which the wireless device 102 temporarily decreases the sleep interval (e.g., new_si=current_si−si_interval). In block 532, the wireless device 102 determines whether the temporarily decreased sleep interval (new_si) is greater than or equal to a minimum value or lower limit of the sleep interval (e.g., whether new_si>=SI_LL). For example, in some embodiments, the minimum value of the sleep interval may be 600 ms. If the wireless device 102 determines, in block 532, that the temporarily increased sleep interval is not greater than or equal to the minimum value, the method 500 advances to block 536 in which the wireless device 102 updates the value/flag associated with updating the sleep interval to discontinue updating the interval (e.g., by assigning update_si=false) in block 536, and the method 500 returns to block 502 to await expiration of the timer/clock. However, if the wireless device 102 determines, in block 532, that the temporarily increased sleep interval is greater than or equal to the minimum value, the method 500 advances to block 534 in which the wireless device 102 updates the value/flag associated with updating the sleep interval to discontinue updating the interval (e.g., by assigning update_si=false) and, in block 520, the wireless device 102 sets the current sleep interval to the temporary sleep interval (e.g., current_si=new_si). The method 500 returns to block 502 to await expiration of the timer/clock.

It should be appreciated that, in some embodiments, the wireless device 102 may include another time/clock set to update the value/flag associated with updating the sleep interval to resume updating the interval and further execution of the method 500 (e.g., by assigning update_si=true). For example, in some embodiments, that value/flag may be updated every day; however, other period may be used in other embodiments. Further, in some embodiments, the sleep interval may be determined on various factors (e.g., including signal strength) according to yet another predefined period (e.g., every week, etc.).

Although the blocks 502-538 are described in a relatively serial manner, it should be appreciated that various blocks of the method 500 may be performed in parallel in some embodiments.

What is claimed is:

1. A method of reducing a power consumption of a wireless device, the method comprising:
performing, by the wireless device, a calibration of wireless communication circuitry of the wireless device in response to establishing a wireless communication connection with a wireless access point;
determining, by the wireless device, a number of disconnections between the wireless device and the wireless access point over a predefined period of time;
increasing, by the wireless device, a sleep interval of the wireless communication circuitry of the wireless device in response to determining the number of disconnections between the wireless device and the wireless access point over the predefined period of time is less than a threshold number of disconnections;
determining, by the wireless device, a second number of disconnections between the wireless device and the wireless access point over the predefined period of time in response to increasing the sleep interval based on the number of disconnections between the wireless device and the wireless access point being less than the threshold number of disconnections; and
returning, by the wireless device, the sleep interval of the wireless communication circuitry of the wireless device to a prior sleep interval in response to determining the second number of disconnections between the wireless device and the wireless access point over the predefined period of time is at least the threshold number of disconnections.

2. The method of claim 1, further comprising:
determining, by the wireless device, an amount of at least one of broadcast or multicast traffic messages received by the wireless device; and
increasing, by the wireless device, the sleep interval of the wireless communication circuitry of the wireless device in response to determining the amount of the at least one of the broadcast or multicast traffic messages received by the wireless device exceeds a threshold amount of traffic.

3. The method of claim 2, further comprising:
determining, by the wireless device, a second number of disconnections between the wireless device and the wireless access point over the predefined period of time in response to increasing the sleep interval based on the amount of the at least one of the broadcast or multicast traffic messages received by the wireless device exceeding the threshold amount of traffic; and
returning, by the wireless device, the sleep interval of the wireless communication circuitry of the wireless device to a prior sleep interval in response to determining the second number of disconnections between the wireless device and the wireless access point over the predefined period of time is at least the threshold number of disconnections.

4. The method of claim 1, wherein determining the number of disconnections comprises periodically determining the number of disconnections between the wireless device and the wireless access point over the predefined period of time.

5. The method of claim 1, further comprising:
determining, by the wireless device, a wireless signal strength of the wireless communication connection established between the wireless device and the wireless access point;
disconnecting, by the wireless device, the wireless communication connection with the wireless access point in response to determining that the wireless signal strength of the wireless communication connection established between the wireless device and the wireless access point is below a threshold signal strength; and
establishing a wireless communication connection with another wireless access point in response to disconnecting the wireless communication connection with the wireless access point.

6. The method of claim 5, further comprising determining, by the wireless device, a wireless signal strength of a prospective wireless communication connection between the wireless device and the another wireless access point; and
wherein disconnecting the wireless communication connection with the wireless access point comprises disconnecting the wireless communication connection with the wireless access point in response to determining that (i) the wireless signal strength of the wireless communication connection established between the wireless device and the wireless access point is below the threshold signal strength and (ii) the wireless signal strength of the prospective wireless communication connection between the wireless device and the another wireless access point is greater than the wireless signal strength of the wireless communication connection established between the wireless device and the wireless access point.

7. The method of claim 1, wherein the wireless communication circuitry comprises Wi-Fi communication circuitry.

8. The method of claim 1, wherein the wireless device comprises an access control device including a physical lock mechanism to secure a corresponding passageway; and
wherein the wireless access point comprises a router.

9. A wireless device, comprising:
a Wi-Fi communication circuitry;
at least one processor; and
at least one memory comprising a plurality of instructions stored thereon that, in response to execution by the at least one processor, causes the wireless device to:
perform a calibration of the Wi-Fi communication circuitry in response to establishing a Wi-Fi communication connection with a wireless access point;
determine a number of Wi-Fi disconnections between the wireless device and the wireless access point over a predefined period of time;
increase a sleep interval of the Wi-Fi communication circuitry in response to determining the number of Wi-Fi disconnections between the wireless device and the wireless access point over the predefined period of time is less than a threshold number of Wi-Fi disconnections;
determine a second number of Wi-Fi disconnections between the wireless device and the wireless access point over the predefined period of time in response to increasing the sleep interval based on the number of Wi-Fi disconnections between the wireless device and the wireless access point being less than the threshold number of Wi-Fi disconnections; and return the sleep interval of the Wi-Fi communication circuitry of the wireless device to a prior sleep interval in response to determining the second number of Wi-Fi disconnections between the wireless device and the wireless access point over the predefined period of time is at least the threshold number of Wi-Fi disconnections.

10. The wireless device of claim 9, wherein the plurality of instructions further causes the wireless device to:

determine an amount of at least one of broadcast or multicast traffic messages received by the wireless device; and increase the sleep interval of the Wi-Fi communication circuitry of the wireless device in response to determining the amount of the at least one of the broadcast or multicast traffic messages received by the wireless device exceeds a threshold amount of traffic.

11. The wireless device of claim 10, wherein the plurality of instructions further causes the wireless device to:

determine a second number of Wi-Fi disconnections between the wireless device and the wireless access point over the predefined period of time in response to increasing the sleep interval based on the amount of the at least one of the broadcast or multicast traffic messages received by the wireless device exceeding the threshold amount of traffic; and return the sleep interval of the Wi-Fi communication circuitry of the wireless device to a prior sleep interval in response to determining the second number of Wi-Fi disconnections between the wireless device and the wireless access point over the predefined period of time is at least the threshold number of Wi-Fi disconnections.

12. The wireless device of claim 9, wherein to determine the number of Wi-Fi disconnections comprises to periodically determine the number of Wi-Fi disconnections between the wireless device and the wireless access point over the predefined period of time.

13. The wireless device of claim 9, wherein the plurality of instructions further causes the wireless device to:

determine a wireless signal strength of the Wi-Fi communication connection established between the wireless device and the wireless access point;

disconnect the Wi-Fi communication connection with the wireless access point in response to determining that the wireless signal strength of the Wi-Fi communication connection established between the wireless device and the wireless access point is below a threshold signal strength; and establish a Wi-Fi communication connection with another wireless access point in response to disconnecting the Wi-Fi communication connection with the wireless access point.

14. The wireless device of claim 9, further comprising a physical lock mechanism having at least one of a latch or a bolt to secure a corresponding passageway.

15. An access control device, comprising:

a Wi-Fi communication circuitry;

a lock mechanism having at least one of a latch or a bolt to secure a corresponding passageway;

at least one processor; and at least one memory comprising a plurality of instructions stored thereon that, in response to execution by the at least one processor, causes the access control device to:

perform a calibration of the Wi-Fi communication circuitry in response to establishing a Wi-Fi communication connection with a wireless access point;

determine a number of Wi-Fi disconnections between the access control device and the wireless access point over a predefined period of time;

increase a sleep interval of the Wi-Fi communication circuitry in response to determining the number of Wi-Fi disconnections between the access control device and the wireless access point over the predefined period of time is less than a threshold number of Wi-Fi disconnections;

determine a second number of Wi-Fi disconnections between the access control device and the wireless access point over the predefined period of time in response to increasing the sleep interval based on the number of Wi-Fi disconnections between the access control device and the wireless access point being less than the threshold number of Wi-Fi disconnections; and return the sleep interval of the Wi-Fi communication circuitry of the access control device to a prior sleep interval in response to determining the second number of Wi-Fi disconnections between the access control device and the wireless access point over the predefined period of time is at least the threshold number of Wi-Fi disconnections.

16. The access control device of claim 15, wherein the plurality of instructions further causes the access control device to:

determine an amount of at least one of broadcast or multicast traffic messages received by the access control device; and increase the sleep interval of the Wi-Fi communication circuitry in response to determining the amount of the at least one of the broadcast or multicast traffic messages received by the access control device exceeds a threshold amount of traffic.

17. The access control device of claim 15, wherein the plurality of instructions further causes the access control device to:

determine a wireless signal strength of the Wi-Fi communication connection established between the access control device and the wireless access point;

disconnect the Wi-Fi communication connection with the wireless access point in response to determining that the wireless signal strength of the Wi-Fi communication connection established between the access control device and the wireless access point is below a threshold signal strength; and establish a Wi-Fi communication connection with another wireless access point in response to disconnecting the Wi-Fi communication connection with the wireless access point.

\* \* \* \* \*